United States Patent [19]
Balgobin

[11] Patent Number: 6,056,336
[45] Date of Patent: May 2, 2000

[54] AIR BAG WITH INTERNAL SHOCK ABSORBER

[76] Inventor: Bissoondeo Balgobin, 1755 Eastburn Ave., Bronx, N.Y. 10457

[21] Appl. No.: 09/330,559

[22] Filed: Jun. 11, 1999

[51] Int. Cl.[7] ............................. B60R 19/20; B60R 19/02
[52] U.S. Cl. ......................... 293/107; 293/118; 293/119
[58] Field of Search ................................... 293/107, 108, 293/118, 119, 133, 134, 142, 145, 102, 117, 9, 110, 143, 144

[56] References Cited

U.S. PATENT DOCUMENTS

| | | | |
|---|---|---|---|
| D. 350,516 | 9/1994 | Hanson | D12/169 |
| 1,580,203 | 4/1926 | Jasheway et al. | 293/107 |
| 3,656,790 | 4/1972 | Truesdell | 293/107 |
| 4,099,759 | 7/1978 | Kornhauser | 293/110 |
| 4,176,858 | 12/1979 | Kornhauser | 293/107 X |
| 5,431,463 | 7/1995 | Chou | 293/110 |
| 5,725,265 | 3/1998 | Baber | 293/107 |
| 5,823,584 | 10/1998 | Carney, III | 293/102 |

FOREIGN PATENT DOCUMENTS

| | | | |
|---|---|---|---|
| 2017465 | 11/1971 | Germany | 293/107 |
| 0155854 | 6/1990 | Japan | 293/107 |
| 2248043 | 3/1992 | United Kingdom | 293/118 |
| 092009456 | 6/1992 | WIPO | 293/119 |

*Primary Examiner*—D. Glenn Dayoan
*Assistant Examiner*—Patricia L Engle
*Attorney, Agent, or Firm*—Darby & Darby

[57] ABSTRACT

An external air bag assembly for mounting in a cavity in a bumper of a vehicle is provided. The assembly includes an air bag and deployable shock-absorbing bumper assembly contained within the air bag. In a retracted state, the bumper assembly projects outward only a limited degree. When released in conjunction with air bag deployment, the bumper assembly expands forward and forms an additional shock absorbing region. Because both the air bag and the bumper assembly are stored in an undeployed and retracted state, the entire assembly has a low profile while still providing a high degree of impact absorbing protection.

12 Claims, 4 Drawing Sheets

AIR BAG WITH INTERNAL SHOCK ABSORBER

FIELD OF THE INVENTION

The present invention relates to an externally mounted vehicle air bag system.

BACKGROUND OF THE INVENTION

Vehicle air bag systems are well known devices. Internally mounted air bags are used bags to protect a vehicle's occupants. It is also known to externally mount air bags to reduce vehicle damage in collision.

An externally mounted air bag arrangement is illustrated in U.S. Pat. No. 5,725,265 to Baber. The air bag is housed in a bumper-like chamber and is deployed when a collision is detected with the purpose of absorbing some of the force of the impact. However, because the air bag system of Baber is actuated automatically during a collision, it may also be accidentally deployed in situations where minor impacts are common, such as parallel parking in tight conditions. In addition, the Baber air bag system relies only upon the cushioning effect of the inflated air bag to reduce collision damage. Once the air bag has been deployed and begins to deflates, it provides limited or no protection from secondary impacts.

An additional drawback to collision activated systems is that the air bag is not deployed until actual contact is made between the colliding vehicles. Because the two vehicles are, by definition, touching during a collision, the expanding air bag will merely force the vehicles apart. This action can cause undesired movement in the vehicles that may result in additional collisions.

A key aspect of air-bags is that they are stored in an uninflated state. A known alternative shock absorber design is a pre-inflated rubber cell mounted to the bumper of a car. U.S. Pat. No. 5,431,463 to Chou discloses such a rubber cell which is designed to deflate upon impact to absorb shock. A compression spring is included within the cell to support the cell's forward wall. A significant drawback to this design is that it is limited in size because the shock absorbing cells are always "deployed." A large cell, with a concurrently large shock absorbing capacity, would project outward from the vehicle an unacceptable amount. Thus, the practical shock absorbing ability of such a cell is relatively small.

Accordingly, is an object of the invention to provide a vehicle air bag system which is compact and which can be pre-deployed by a vehicle operator before a collision.

It is a further object of the invention to provide an external air bag assembly which is affective in absorbing the force of both primary and secondary impacts.

Yet another object of the invention is to provide an air bag arrangement that is easy to reset after deployment.

SUMMARY OF THE INVENTION

These and other objects are provided by an externally mounted air bag which, according to the invention, includes an internal shock absorbing means. The air bag is mounted on the front or rear end of the vehicle and is made of a durable material which is designed to withstand high pressures without rupturing. The bag is deployed in response to an actuation signal from a switch mounted in the interior of the car. An automatic deployment sensor can also be used.

A retractable shock-absorbing bumper assembly is contained within the air bag. In a retracted state, the bumper assembly projects outward only a limited degree. When released in conjunction with air bag deployment, the bumper assembly expands forward and forms an additional shock absorbing region. According to the invention, the air bag thus provides a "first line" of defense in absorbing the impact from a collision and the deployed bumper assembly forms a secondary shock absorber to both impact forces which are too great for the air bag alone and also to absorb shocks from any additional collisions which may occur after the air bag has begun to deflate. Because both the air bag and the bumper assembly are stored in a retracted state, the entire assembly has a low profile while still providing a high degree of impact absorbing protection.

BRIEF DESCRIPTION OF THE DRAWINGS

The foregoing and other features of the present invention will be more readily apparent from the following detailed description and drawings of an illustrative embodiment of the invention in which.

DETAILED DESCRIPTION OF THE PREFERRED EMBODIMENTS

Figure 1:
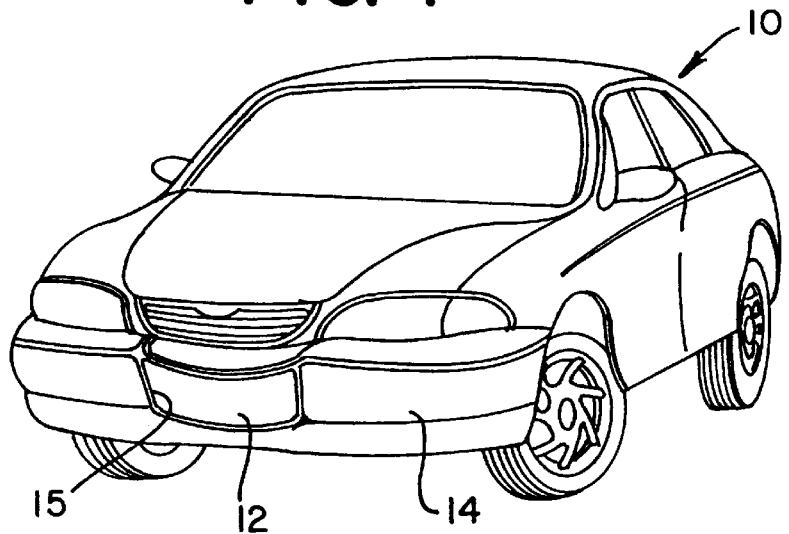
FIG. 1 is an illustration of a vehicle including a forward mounted air bag system according to the present invention.

FIG. 1 is an illustration of a vehicle 10 which includes a forward mounted air bag assembly 12. Preferably, the air bag assembly 12 is mounted in a housing within a suitable recess 15 in the bumper 14. The recess 15 may be formed during the car manufacturing process. Alternatively, such a recess may be created by removing a portion of the bumper and replacing it with an appropriate mounting assembly. Although the air bag 12 is shown mounted on the front of the vehicle, it is recognized that the assembly may also be mounted in a rearward facing direction on the rear of the vehicle.

Figure 2:
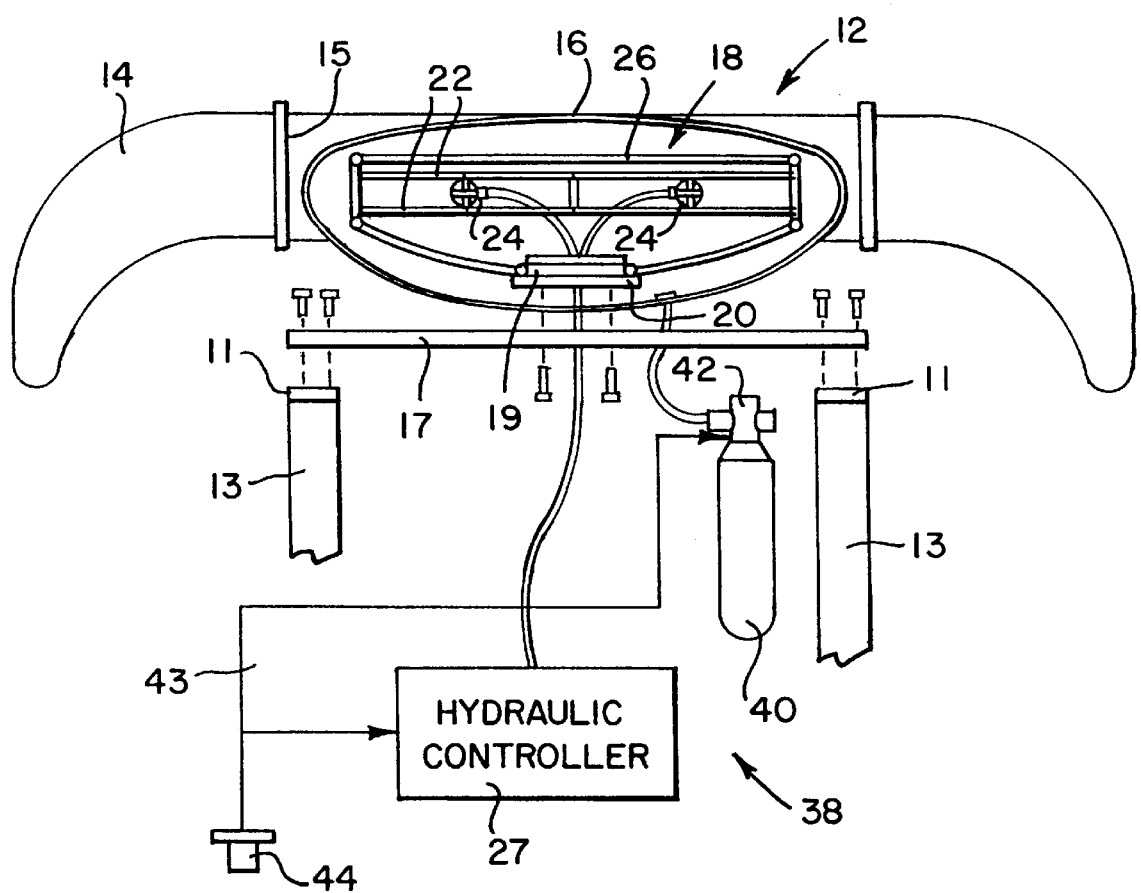
FIG. 2 is a top exploded view of one embodiment of the air bag system in a stowed configuration.

Tuning to FIG. 2, there is shown a top exploded view of one embodiment of the air bag assembly 12 according to the invention. The air bag assembly 12 is comprised of a conventional air bag 16 with an internal deployable shock absorbing bumper assembly 18. The air bag assembly 12 is affixed to the vehicle 10 at primary mounting plate 17 which may be an integral part of bumper 14. Alternatively, plate 17 may be added as an additional component which is itself mounted to brackets 11 on a forward portion 13 of the vehicle chassis during the air bag installation process.

The bumper assembly 18 is affixed, e.g., by bolts, to the primary mounting plate 17 by a housing mounting plate 19, preferably made of steel. The rear portion of air bag 16 is sandwiched between housing mounting plate 19 and primary mounting plate 17. The air bag 16 is comprised of conventional reinforced fabrics which are preferably strong enough to withstand a collision without rupturing. Materials of this type include fiber reinforced plastic, rubberized material, and pliable carbon fiber composites. To reduce the likelihood of tearing, a rubber pad 20 is preferably situated between the airbag 16 and the housing mounting plate 19.

The air bag is deployed by a conventional air bag deployment mechanism 38, which preferably comprises a conventional gas canister 40 and a canister release mechanism 42 having control signal 43. The particulars of the deployment mechanism can vary according to various design considerations, such as the size of the air bag and the speed at which it needs to deploy. The air bag 16 is sized so that when deployed, it will cover at least a portion of the front of the vehicle, and, is preferably large enough to protect a substantial portion of the front of the vehicle, but not so large as to substantially obstruct the driver's view when the air bag 16 is deployed. It is understood that the deployed air bag can be considerably larger than the internal bumper assembly 18.

Figure 3:
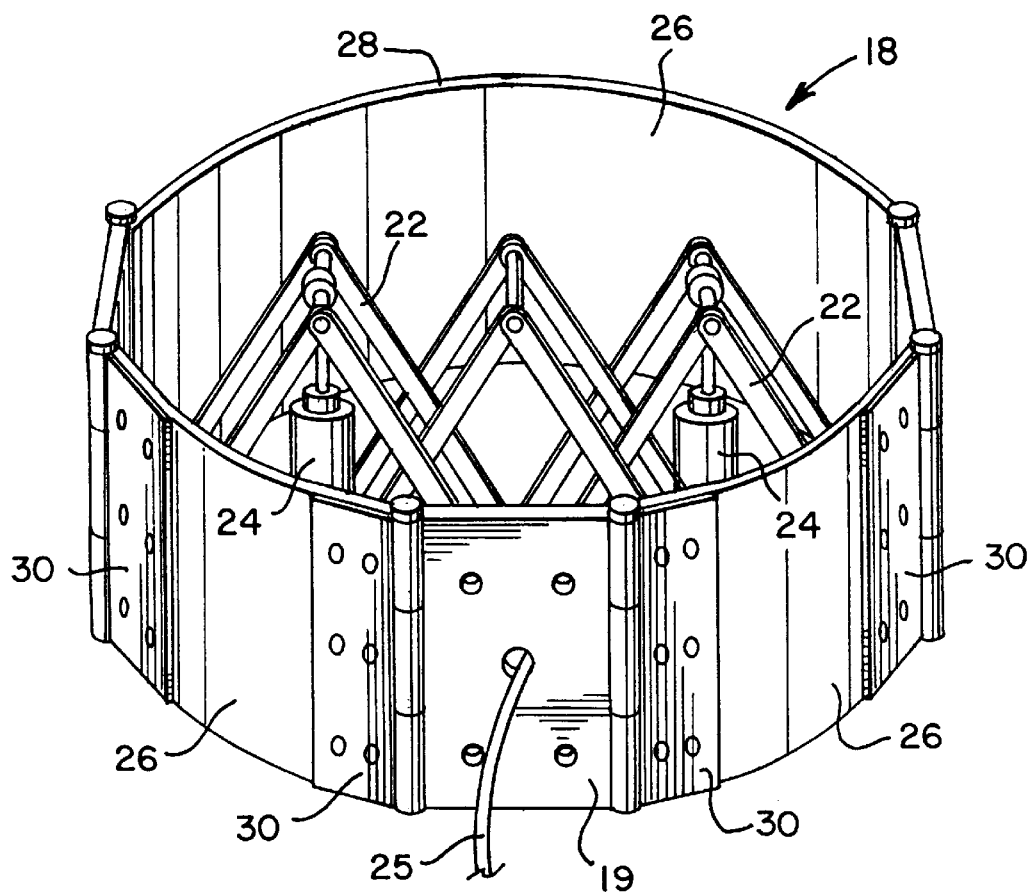
FIG. 3 is a perspective view of the bumper assembly of the air bag system of FIG. 2 in an deployed configuration.
Figure 4:
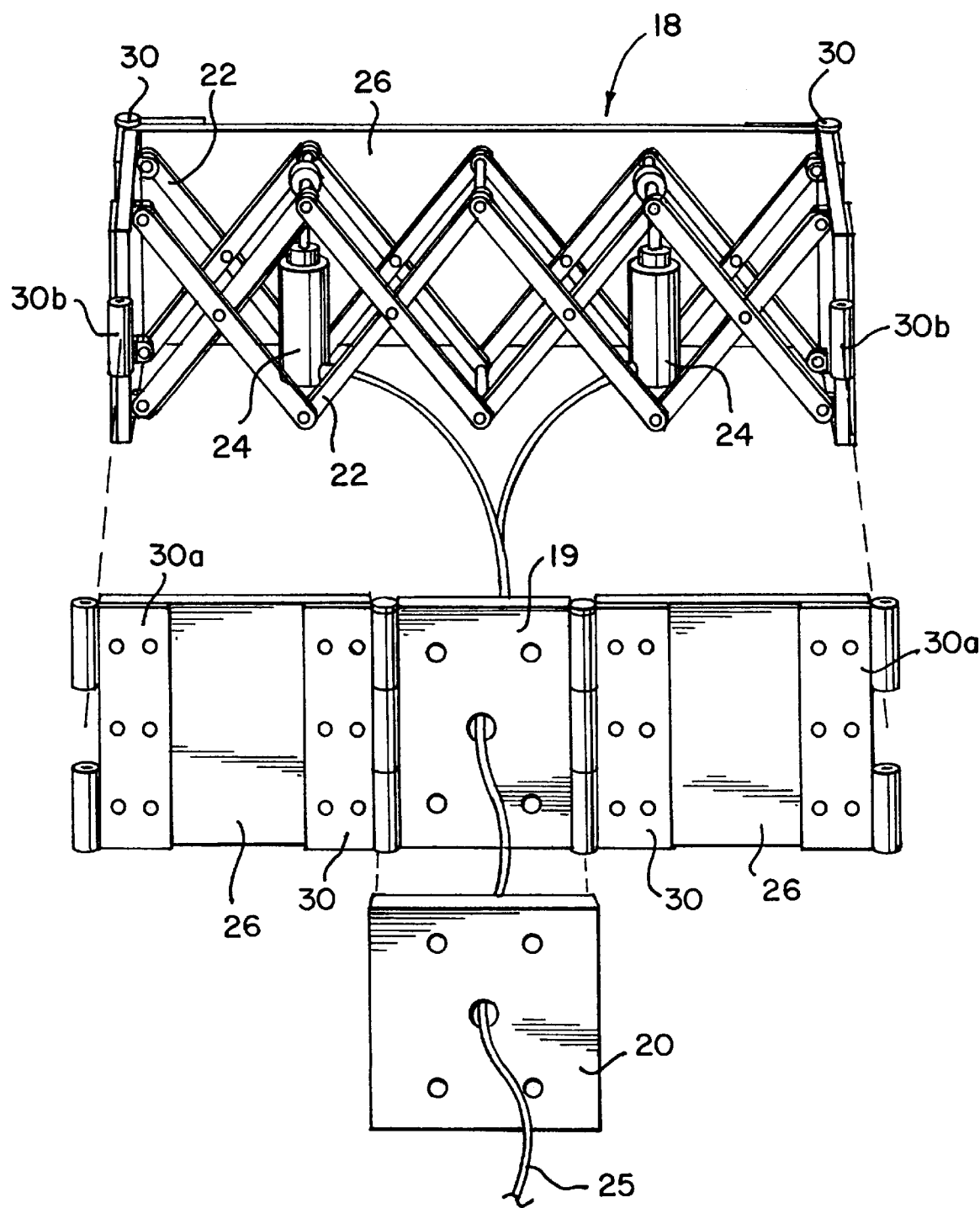
FIG. 4 is a perspective exploded view of the bumper assembly of FIG. 3 in a retracted position.

With reference to FIGS. 3 and 4, the bumper assembly 18 within the air bag 16 is comprised of a selective expansion mechanism, such as one or more sets of double folding scissor bars 22 which can be extended or retracted by means of hydraulic pistons 24 having hydraulic lines 25 which are connected to a suitable hydraulic controller 27 (see FIG. 2).

The scissor bars 22 are surrounded by and mounted to a housing 26 comprised of a flexible and at least marginally elastic material, such as steel-belted rubber. Bumper assembly 18 is configured such that when scissor bars 22 are retracted, housing 26 extends outward from the front of the vehicle and acts as a shock absorber. When the scissor bars 22 are extended, however, the leading portion 28 of the flexible housing 26 is stretched and generally straightened such that it does not extend appreciably outward from the front of the vehicle. The circumference of housing 26 is preferably slightly less than required to fully surround the scissor arms 22 when fully extended so that when the arms 22 are extended, the housing 26 stretches somewhat. This creates an elastic force which will aid in retracting the scissor arms during deployment.

Figure 5:
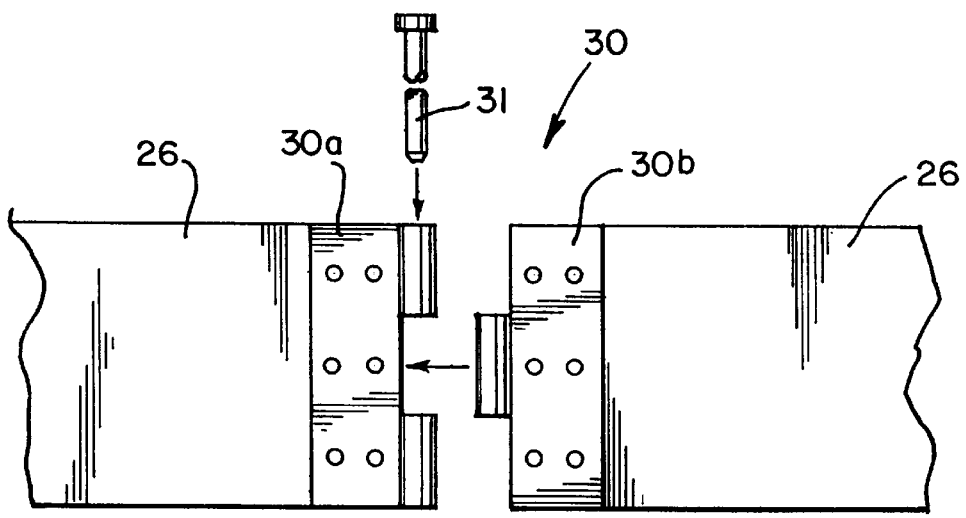
FIG. 5 is an illustration of a hinge mechanism used within the bumper assembly.

Although the housing 26 may be a single ring or strip of material, preferably it is formed of several segments which are connected together by hinge clamps 30 comprising hinge segments 30a, 30b which are bolted to the ends of segments of housing material 26 and connected together by pin 31 as shown in FIG. 5.

Preferably, the hydraulics and airbag canister are both controlled by a signals generated in response to the actuation of a switch 44 mounted on the dashboard of the vehicle and deployed generally simultaneously. Preferably, the signal from the dashboard actuator is an electrical signal which cannot be activated unless the vehicle ignition is on. Alternatively, a mechanical linkage can be used.

Figure 6:
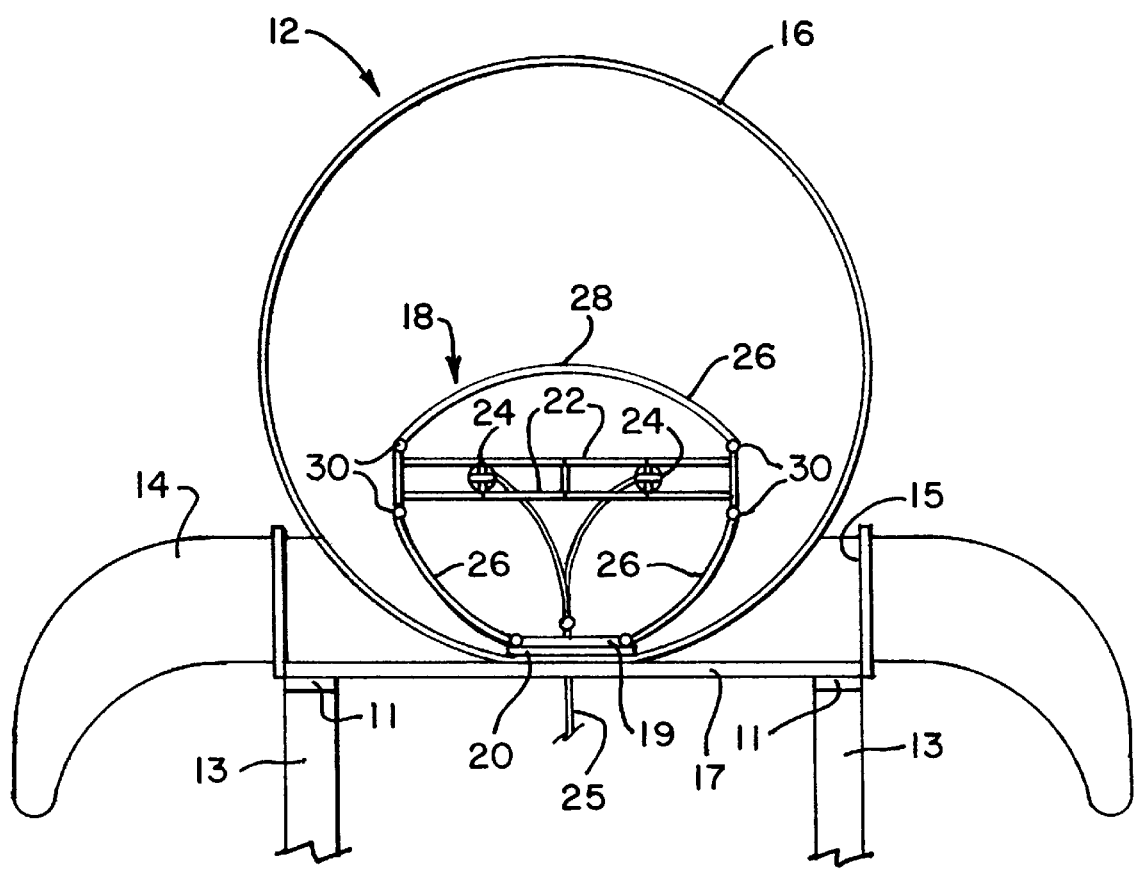
FIG. 6 is a top view of the air bag system in a deployed configuration.

FIG. 6 is an illustration of the airbag assembly 12 in a deployed form. When switch 44 is pressed, pressure from the airbag canister 40 is released to thereby deploy the airbag 16. In addition, the hydraulic pistons 24 are extended to retract the scissor arms 22, and so allowing the surrounding housing 26 to transform from the generally rectangular "stowed" shape, shown in FIGS. 2 and 4, to the more circular shape illustrated in FIGS. 3 and 6. When extended, the leading portion 28 of the housing 26 extends beyond the front of bumper 14 and acts as a shock absorber.

In a collision, the deployed air bag 16 will absorb the force of impact. Additional forces are absorbed by the elastic nature of the bumper assembly 18. In some instances, such as after an initial collision, the air bag 16 may begin to deflate. Additional impact forces, such as may occur from a secondary impact, will then be absorbed by the deployed bumper assembly 18. Furthermore, because the bumper assembly 18 extends outward beyond the forward surface of the bumpers, the bumper assembly serves to protect the remaining forward portions of the vehicle from additional damage. Thus, the invention provides for a dual impact absorbing air bag system.

According to a further aspect of the invention, the air bag assembly 12 is easy to reset. By activating the hydraulics 24 with the switch, the scissor arms 22 can be reextended. This effectively retracts the housing 16 and, as it is straightened, brings leading edge 28 within the confines of the recess 15 in the bumper. The airbag can then be manually deflated, if necessary, and repacked into recess 15. A cover (not shown) can then be placed over recess 15. To complete the reset operation, the user merely needs to replace or recharge the canister 40.

While the invention has been particularly shown and described with reference to a preferred embodiment, it will be understood by the skilled in the art that various changes in form and detail may be made without departing from the spirit and scope of the invention.

I claim:

1. An air bag system for placement on the exterior of a vehicle comprising:

an air bag; and a deployable bumper assembly coupled to an expansion mechanism contained within the air bag, the bumper assembly having a movable forward surface, the forward surface projecting outward from the vehicle a first distance when the bumper assembly is in a retracted condition and projecting outward from the vehicle a second distance which is greater than the first distance when the bumper assembly is in a deployed condition.

2. The air bag system of claim 1, wherein:

the expansion mechanism is selectively expandable and retractable along an axis substantially parallel to the exterior of the vehicle; and a flexible housing surrounding at least an outward facing portion of the expansion mechanism.

3. The air bag system of claim 2, wherein the expansion mechanism comprises:

at least one double folding scissor bar; and a hydraulic piston coupled to the folding scissor bar.

4. The air bag system of claim 2, wherein the flexible housing comprises steel belted rubber.

5. The air bag system of claim 1, wherein:

said deployable bumper assembly is selectively deployed in response to a control signal;

said air bag system further comprising:

a gas canister coupled to the air bag; and a canister release mechanism responsive to a said control signal.

6. The air bag system of claim 5, wherein said control signal is generated by a manually actuated switch suitable for mounting on a dashboard of the vehicle.

7. An air bag system for placement in a cavity in the bumper of a vehicle, the bumper having a forward edge, the system comprising:

a primary mounting plate within said cavity;

a deployable shock-absorber assembly affixed to the primary mounting plate, the shock-absorber assembly being at least substantially contained within said cavity when in a retracted condition and projecting outward from the cavity beyond a leading edge of the bumper when in a deployed condition, the deployable shock-absorber being selectively deployed in response to a first control signal;

an air bag encompassing the deployable shock-absorber and affixed to the primary mounting plate;

a gas canister coupled to the air bag;

a canister release mechanism responsive to a second control signal for deploying the air bag; and a switch for generating said first and second control signals to deploy the air bag and the shock-absorber bumper.

8. The air bag system of claim 7, wherein the shock-absorber assembly comprises:

a expansion mechanism which is selectively expandable and retractable along an axis substantially parallel to the exterior of the vehicle; and a flexible housing surrounding at least an outward facing portion of the expansion mechanism.

9. The air bag system of claim 8, wherein the expansion mechanism comprises:

at least one double folding scissor bar;

a hydraulic piston coupled to the folding scissor bar; and a hydraulic actuator responsive to said first control signal.

10. The air bag system of claim 9, wherein the flexible housing comprises:

a housing mounting plate affixed to the primary mounting plate; and a steel belted rubber strip hingedly connected the housing mounting plate;

the air bag being affixed to the primary mounting plate by being sandwiched between the primary mounting plate and the housing mounting plate.

11. The air bag system of claim 10, further comprising a rubber pad situated between the air bag and the housing mounting plate 19.

12. The air bag system of claim 10, wherein said switch is a manually actuated switch configured to be mounted in a dashboard of the vehicle.

\* \* \* \* \*